July 8, 1958     H. T. HASKELL     2,841,917
ARTIFICIAL FISHING LURE HOOK GUARD
Filed April 6, 1956
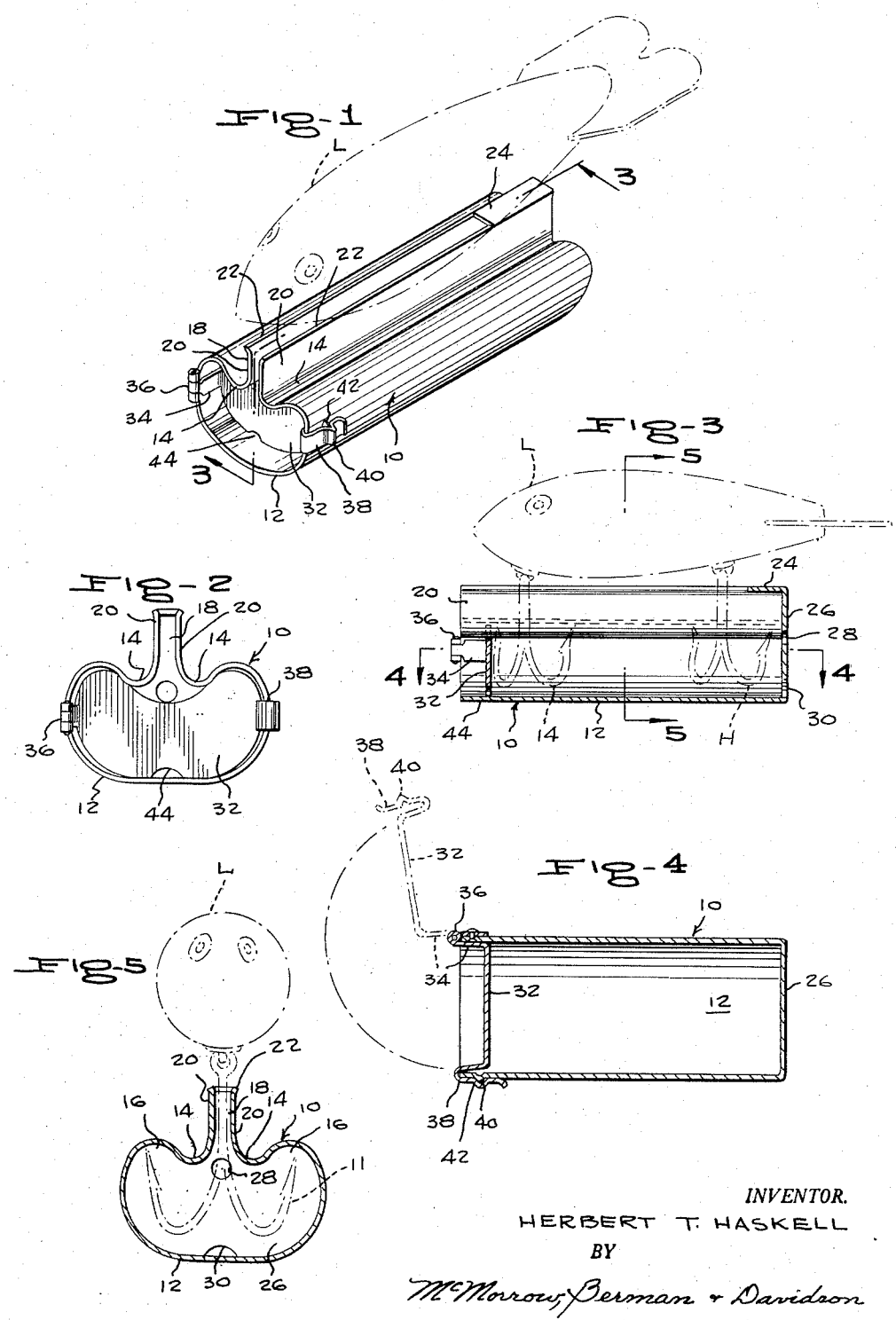
INVENTOR.
HERBERT T. HASKELL
BY
McMorrow, Berman & Davidson
ATTORNEYS

United States Patent Office 2,841,917
Patented July 8, 1958

2,841,917
ARTIFICIAL FISHING LURE HOOK GUARD

Herbert T. Haskell, El Paso, Tex.

Application April 6, 1956, Serial No. 576,593

1 Claim. (Cl. 43—54.5)

This invention relates to guards for treble hooks of fishing lures or plugs. More particularly, the invention has reference to guards adapted to be readily applied to or removed from a conventional fishing lure, with the guard when applied being designed to protectively enclose the treble hook or hooks of the fishing lure.

The broad object of the present invention is to provide a guard device for treble hooks of fishing lures or plugs, of a generally improved construction. Among more specific objects of the invention are the following:

First, to prevent the hooks, when the guard device is applied thereto, from becoming entangled with one another or with any other object;

Second, to prevent the points of the hooks from becoming embedded in one's skin, clothing, or in any other material while the lure is being handled;

Third, to prevent the points of the treble hooks from becoming dulled;

Fourth, to permit individual lures to be carried in a tackle box, in the pockets of one's clothing, or in any other manner without the requirement of using special boxes or containers therefor;

Fifth, to provide a guard device which will cover only the hooks of the fishing lure, so that the body of the lure may be handled with ease in attaching the lure to a fishing line, or in detaching the lure from said line; and Sixth, to allow a guard formed in a single size to be used on any lure having treble hooks of approximately the same size, regardless of the shape of the body of the lure.

Other objects will appear from the following description, the claim appended thereto, and from the annexed drawing, in which like reference characters designate like parts throughout the several views, and wherein:

Figure 1 is a perspective view of a guard device formed according to the present invention, in operative, hook-enclosing relationship to a lure of conventional design, the lure being shown in dotted outline;

Figure 2 is an enlarged end elevational view of the hook guard per se, as seen from the left of Figure 1;

Figure 3 is a reduced longitudinal sectional view through the hook guard, taken substantially on line 3—3 of Figure 1, the lure being shown in dotted lines;

Figure 4 is a plan sectional view taken longitudinally through the hook guard, substantially on line 4—4 of Figure 3, a hinged door or end wall being shown in full and dotted lines in closed and open positions respectively; and Figure 5 is an enlarged transverse sectional view substantially on line 5—5 of Figure 3.

The hook guard constituting the present invention has been generally designated by the reference numeral 10 in the several figures of the drawing, and in Figures 1, 3, and 5 is shown in hook-protecting relationship to a conventional fishing lure L having longitudinally spaced, depending treble hooks H. At this point, it should be noted that the particular shape of the lure can be varied within a wide range, without affecting adversely the operating characteristics of the device, and the illustrated lure is merely one of many conventional types the hooks of which can be protected by the hook guard.

The hook guard 10 includes a tubular, elongated body 12, which can be formed from a single piece of sheet metal or plastic. In cross section, the tubular body may appropriately be considered as being of a kidney shape, with a transversely curved bottom wall merging into oppositely, transversely curved side walls, the side walls merging in turn into a top wall having, in closely spaced relation to the longitudinal center line of the body, longitudinally extending, transversely depressed portions 14, 14 defining within the body at the top thereof recesses extending the full length of the body and designated at 16, 16, said recesses being adapted to receive the points or tips of the treble hooks H.

Between the transversely depressed portions 14, the top wall of the body is formed with a longitudinal slot 18, opening at one end upon one end of the body, the body being formed at opposite sides of said slot with upwardly projecting longitudinal flanges 20 defining between them a passage receiving the shanks of the hooks H. The flanges 20, at their top edges, have outwardly turned lips 22 to facilitate the insertion of the hooks, prevent one from accidentally cutting his fingers upon the top edges of the flanges, and prevent scratching of the body of the lure when the device is applied to the respective hooks H.

The body is integrally formed, at one end, with a transverse abutment 24 closing the slot 18 at one end, said abutment being integral with and extending between the top edges of the flanges 20 to limit relative longitudinal movement of the lure and the hook guard in one direction. The abutment 24 is also integral with an end wall 26 permanently closing the body at one end, and the end wall 26 has spaced drain holes 28, 30 to assure drainage of water from the body, the drain hole 30 being disposed at the bottom of the body.

At the open end of the body there is provided a door 32, which in its outer configuration substantially duplicates the kidney shaped cross section of the body 12. Door 32 is recessed in the open end of the body when in closed position as shown to particular advantage in Figures 1 and 4, and at one side of the body the door is formed with a forwardly projecting tongue 34 hinged at 36 to the adjacent side wall of the body. At its other side, the door 32 has a U-shaped extension 38 providing a spring latch, the free end portion of the latch having an outwardly pressed indentation 40 defining a recess receiving a lug 42 struck out from the adjacent side wall of the body 12.

It will be seen that by pulling outwardly on the free end portion of the latch, the lug is disengaged, and the door can be swung to the open, dotted line position thereof shown in Figure 4 to permit insertion or removal of the hooks H.

The door is also formed with means facilitating drainage of water, and to this end there is provided at the bottom edge of the door a draining recess 44.

In use of the device, one need merely open the door or hinged end wall 32, after which the device is shifted longitudinally of the lure, with the hook shanks entering the slot 18. When the hooks have been fully enclosed, in the positions shown in Figure 3, the door is closed and secured by its latch.

It will be observed that the device is so designed that the lure body is not enclosed, thus facilitating the handling of the lure body when the same is being attached to or is being detached from a fishing line, not shown. Further, another important characteristic of the invention resides in the fact that it can be applied to lures of different shapes or sizes, without requirement of modifying or redesigning the device, or changing the size thereof in any way.

Still further, the construction is such as to insure to the maximum extent that the hooks will not be dulled. By reason of the illustrated formation of the device, the points of the hooks are protectively enclosed, but are prevented from engaging any adjacent portions of the device in a manner that would result in dulling of the hooks.

Still further, the hook guard is designed to permit the lure, with the hooks H thereof protectively enclosed, to be carried in one's pocket, in a tackle box, or in any other location without requirement of utilizing specially designed boxes or containers, since each lure has its own hook guard, with the guard being designed to prevent entanglement of the hooks not only with adjacent objects, but also with one another.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

A guard for treble hooks of artificial lures comprising an elongated, tubular body formed open at least at one end thereof to permit treble hooks to be inserted in and extracted therefrom, said body at one side thereof being indented longitudinally over its full length and having a narrow longitudinal slot located medially between opposite sides of the indentation, said slot opening at said end to form a passage for the shanks of the hooks; door means on the body indented along one side corresponding to the indentation of the body for closing the open end thereof against the accidental movement of hooks out of the body; and a pair of wide, flat, longitudinal flanges on the body spaced transversely thereof and projecting outwardly therefrom wholly exteriorly of the body along the opposite sides of the slot, said flanges lying in parallel planes to extend said passage a substantial distance outwardly from the body, thus to enclose, exteriorly of the body, substantial portions of the lengths of the hook shanks while maintaining the width of the passage substantially constant over the full depth thereof, said indentation defining, at opposite sides of the slot, longitudinally extending depressed portions of the body and said depressed portions defining within the body longitudinal recesses separated from each other by the slot and by the depressed portions and adapted to receive tips of fishhooks the shanks of which extend through the slots.

References Cited in the file of this patent

UNITED STATES PATENTS

| | | |
|---|---|---|
| 1,634,030 | Korkames | June 28, 1927 |
| 2,242,509 | Coalson | May 20, 1941 |
| 2,548,080 | Thorn | Apr. 10, 1951 |
| 2,723,484 | Nelson | Nov. 15, 1955 |

OTHER REFERENCES

"Modern Packaging" (pub.), May 1956, page 135 especially cited.